(12) United States Patent
Ueno et al.

(10) Patent No.: US 6,550,935 B1
(45) Date of Patent: Apr. 22, 2003

(54) ILLUMINATION DEVICE HAVING AN INVERTER AND AN IGNITER DISPOSED IN A LAMP BODY

(75) Inventors: Masatoshi Ueno, Niigata (JP); Hisao Kataoka, Niigata (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/830,162
(22) PCT Filed: Oct. 2, 2000
(86) PCT No.: PCT/JP00/06845
§ 371 (c)(1),
(2), (4) Date: Apr. 23, 2001
(87) PCT Pub. No.: WO01/23803
PCT Pub. Date: Apr. 5, 2001

(30) Foreign Application Priority Data

Sep. 30, 1999 (JP) .......................................... 11-280151
Sep. 30, 1999 (JP) .......................................... 11-280153

(51) Int. Cl.⁷ ................................................ F21K 27/00
(52) U.S. Cl. ........................ 362/263; 362/265; 362/548
(58) Field of Search ................................ 362/263, 265, 362/296, 327, 546, 548; 313/594, 113, 570

(56) References Cited

U.S. PATENT DOCUMENTS

| 5,124,895 | A | * | 6/1992 | Segoshi et al. ............. 362/265 |
| 5,188,444 | A | | 2/1993 | Makita et al. |
| 5,678,916 | A | * | 10/1997 | Watanabe et al. ........... 362/465 |
| 5,879,073 | A | * | 3/1999 | Hori et al. .................. 362/344 |
| 6,008,584 | A | | 12/1999 | Kodaira et al. |
| 6,066,921 | A | | 5/2000 | Nakamura et al. |

FOREIGN PATENT DOCUMENTS

| JP | 6-165522 | 6/1994 |
| JP | 7-57503 | 3/1995 |
| JP | 7-114805 | 5/1995 |
| JP | 10-147174 | 6/1998 |
| JP | 10-223003 | 8/1998 |
| JP | 10-228804 | 8/1998 |

* cited by examiner

Primary Examiner—Sandra O'Shea
Assistant Examiner—Ronald E. DelGizzi
(74) Attorney, Agent, or Firm—Burns, Doane, Swecker & Mathis, LLP

(57) ABSTRACT

A luminaire includes a discharge lamp, a lighting device supplying a power for lighting the discharge lamp, and a lamp body for housing the discharge lamp and an igniter for starting the discharge lamp, the lighting device and igniter being provided separately, while the lighting device being disposed in the lamp body, whereby such parts employed in the lighting device as harness or the like to which a high voltage is applied can be shortened in the length to be able to improve the safety.

11 Claims, 12 Drawing Sheets

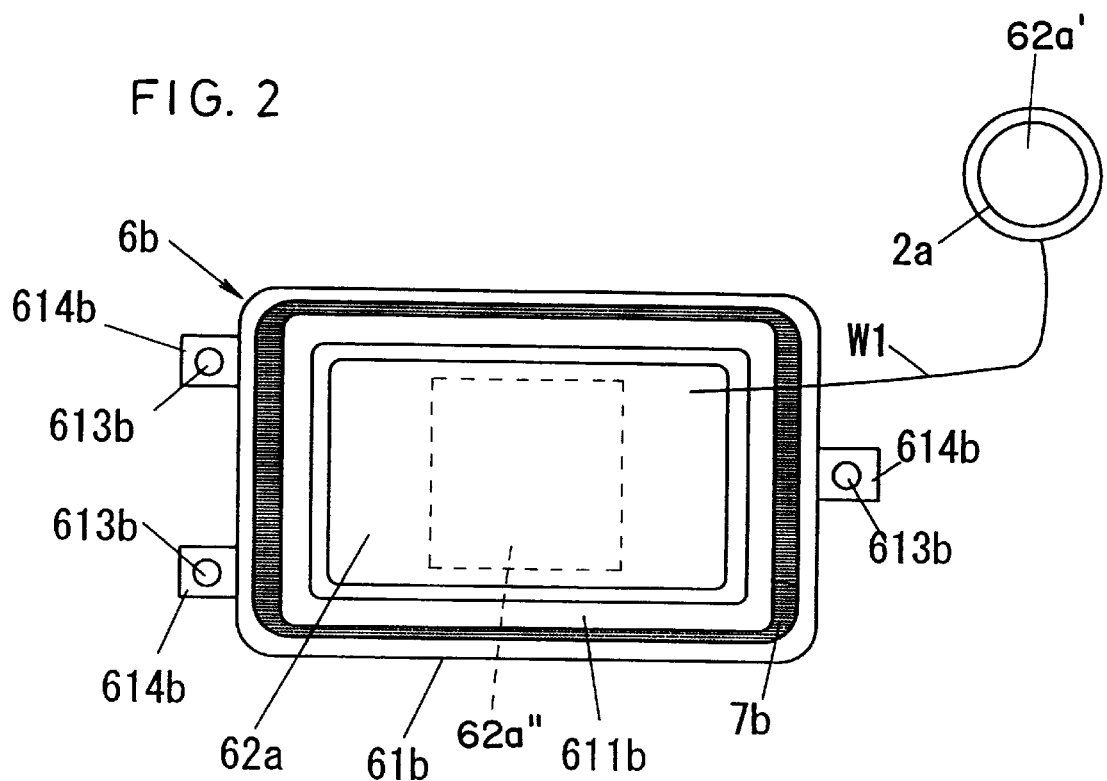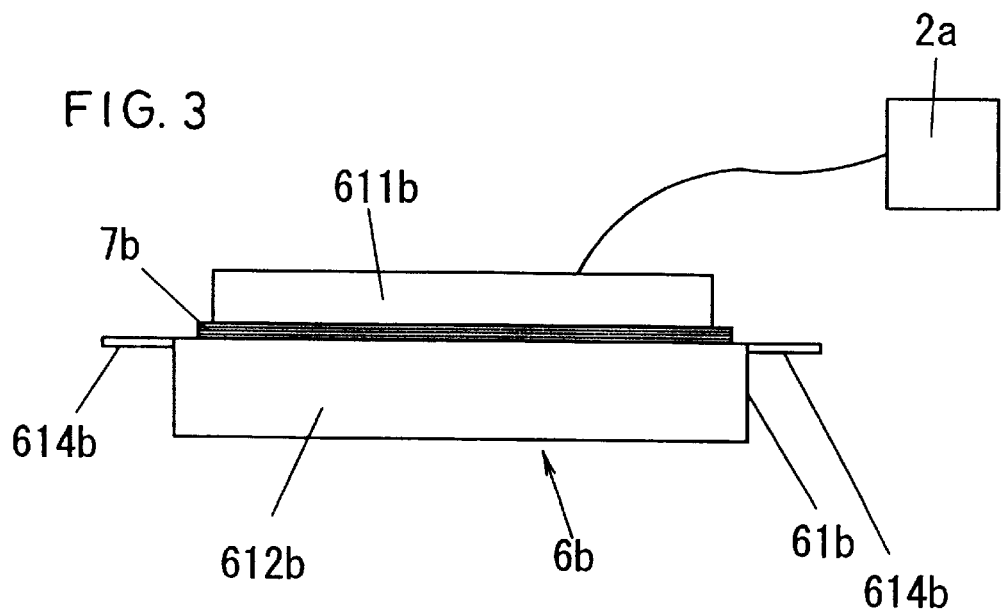

US 6,550,935 B1

ILLUMINATION DEVICE HAVING AN INVERTER AND AN IGNITER DISPOSED IN A LAMP BODY

TECHNICAL FIELD

This invention relates to luminaires, for example, a luminaire employed in automotive head lamp.

BACKGROUND OF THE INVENTION

The luminaires employed in the automotive head lamps have been disclosed in Japanese Patent Laid-Open Publications Nos. 7-57503 and 10-147174, Japanese Patent No. 2,761,132, U.S. Pat. No. 6,066,921 and so on. In particular, U.S. Pat. No. 6,066,921 has been assigned to the same assignee as the assignee of the present application, and its luminaire comprises a lamp including a discharge lamp, socket, reflector, lamp cover, lens and lamp body, a lighting device including an inverter and igniter, and a coupler, wherein the socket connected through cables to the lighting device inserted in the lamp.

In the conventional luminaire as in the above, however, there have been problems that, since in general the socket and igniter in the lighting device are connected through a harness, parts of a high withstand-voltage are required when a high voltage is applied to the harness, the startability is deteriorated, and so on.

SUMMARY OF THE INVENTION

The present invention is to overcome the foregoing problems, and its object is to provide a luminaire which can reduce the length of such part to which the high voltage is applied as the harness employed in the lighting circuit, and which can attain an excellent startability.

In order to solve the above problems, it is an object that the luminaire according to the present invention is characterized in comprising a discharge lamp, a lighting device for supplying a power for lighting the discharge lamp, an igniter for starting the discharge lamp, and a lamp body having at least a discharge-lamp holding member and housing the discharge lamp, wherein the lighting device and igniter are provided as separated, the lighting device is provided in the lamp body, and the igniter is provided adjacent to the discharge lamp.

Other objects and advantages of the present invention should become clear from the description made in the followings with reference to embodiments shown in accompanying drawings.

BRIEF DESCRIPTION OF THE DRAWINGS

While the present invention shall now be described with reference to the respective embodiments shown in the accompanying drawings, it should be appreciated that the intention is not to limit the present invention only to these embodiments but rather to include all alterations, modifications and equivalent arrangements:

FIG. 2 is a plan view showing a lighting unit of FIG. 1;

FIG. 3 is a side view of the lighting unit in FIG. 1;

THE BEST MODE FOR CARRYING OUT THE INVENTION

Figure 1:
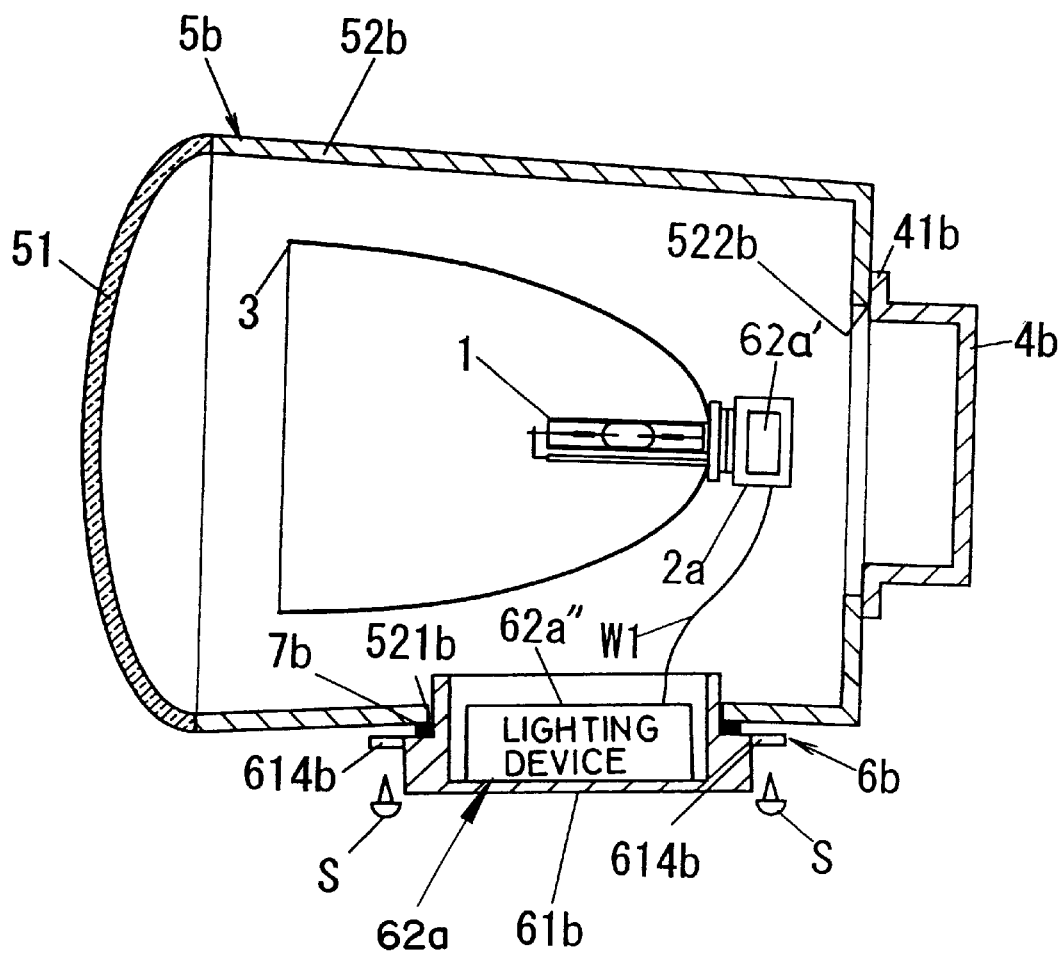
FIG. 1 is a sectioned view showing the luminaire in an embodiment according to the present invention.

The luminaire in an embodiment of the present invention as shown in FIGS. 1–3 may be used as an automotive head lamp, which comprises[, in concrete,] such discharge lamp 1 as a metal halide lamp, a lamp socket 2a formed in a bottomed cylindrical shape, i.e., closed at one end, and capable of mounting a rear (righthand in the drawings) electrode section of the discharge lamp 1. The lamp socket 2a has connecting terminals for electrical connection to respective electrodes of the discharge lamp 1 and, preferably, is provided with an igniter 62a'. The luminaire further includes a reflector 3 which is a concave mirror (mirror of paraboloid of revolution in the drawings) for reflecting luminous light of the discharge lamp 1 forward (leftward in the drawing) and having a hole at the rearmost part for inserting the discharge lamp 1 into the concave mirror, and a lamp cover 4b for mounting and exchanging the discharge lamp 1 and formed in a box shape opened on its front face (including a bottomed cylinder). Further, a lamp fixture 5b, a flighting unit 6b, an elastic member 7b and a first coupler member 8b are provided. Further, as is conventional, the reflector 3 is mounted inside the lamp fixture 5b to be angularly adjustable. The lighting unit 6b has a lighting device 62a including an inverter 62a", and the inverter 62a" is to be installed as separated from the igniter 62a' mounted to the lamp socket 2a.

The lamp fixture 5b is constituted by a lens 51 consisting of such light transmitting material as glass and disposed in front of the discharge lamp 1, and a metal-made lamp body 52b for housing in the interior the discharge lamp 1, lamp socket 2a and reflector 3. This lamp body 52b is formed in a box shape having a front opening closed by the lens 51, a first opening 521b made in a range (part) covering both of upper rear side and rear upper side with respect to the discharge lamp 1, and a second opening 522b on a rear center side. Adjacent the first opening 521b of the lamp body 52b, tapped holes are provided for use with screws S. Further, to the second opening 522b of the lamp body 52b, respective projections 41b of the lamp cover 4b are engaged.

The lighting unit 6b is constituted to be integrally provided with a block member 61b and the lighting device 62a. The block member 61b is made by a metal plate or the like having a shield effect, and to have a shape which blocks the first opening 521b of the lamp body 52b, or to have fitting parts 611b fitting into the first opening 521b at respective edge parts on upper and rear sides with respect to the discharge lamp 1, so as to be L-shaped in section and facing at one surface downward and at the other surface forward. Further, the respective fitting parts 611b have a plurality of through holes 613b for passing the screws S. On the other hand, the lighting device 62a is to start and light the discharge lamp, and is mounted to an inner surface of the block member 61b. Also, the lamp socket 2a is connected to the lighting device 62a by, for example, two cables W1 used as the harness, and outputs of the lighting device 62a and respective connecting terminals of the lamp socket 2a are electrically interconnected. Further, the lighting device 62a is provided with, for example, a coupler exposed to the exterior, for the supply of power from the exterior.

The elastic member 7 comprises a rubber member or the like which is interposed between the lamp fixture 5b and the block member 61b for sealing between them. Further, the elastic member 7b is adhered to, for example, an inner surface of edge parts of the respective fitting parts 611b or to projections 612b of the lighting unit 6b, by means of an adhesive, double-side adhesive tape or the like.

Referring next to an example of an assembling sequence of the lighting unit 6b to the lamp fixture 5b, the lighting unit 6b with the side of the lighting device 62 a faced down is first fitted into the first opening 521b of the lamp body 52b, and next the lighting unit 6b is screwed to the lamp body 52b using the plurality of screws S. Next, the discharge lamp 1 is inserted through the mouth of the reflector 3 into the concave mirror and is mounted to the rearmost part of the reflector 3. In this case, the arrangement may be so made as to mount the discharge lamp 1 to the rearmost part of the reflector 3 through a mounting member (such as a fixture or the like), or to configure the reflector 3 for allowing the discharge lamp 1 to be directly mounted to the rearmost part of the reflector. The lamp socket 2a provided with the igniter 62a' is mounted to the electrode part of the discharge lamp 1, and then the lamp cover 4b is fitted as rotated to the lamp body 522b, whereby the interior of the lamp fixture 5b is in a sealed state.

It is needless to say that the assembly sequence is not limited to the above but other assembly sequences may be adopted. For example, the assembly sequence may be such that the lighting unit 6b is first fitted in the first opening 521b of the lamp body 52b, then the lighting unit 6b is screwed to the lamp body 52b with the plurality of screws S, thereafter the electrode part of the discharge lamp 1 is mounted to the lamp socket 2a, subsequently the discharge lamp 1 is inserted into the concave mirror through the mouth of the reflector 3, and the discharge lamp 1 and lamp socket 2a are mounted to the rearmost part of the reflector 3. Thereafter, the lamp cover 4b is fitted as rotated into the first opening 521b of the lamp body 52b. In this case, the arrangement may also be such that the discharge lamp 1 and lamp socket 2a, integrally mounted with a mounting fixture or the like, is mounted to the rearmost part of the reflector 3, or the reflector 3 may be so configured as to allow the discharge lamp 1 and lamp socket 2a to be directly mounted to the rearmost part.

Now, since in the present embodiment the igniter 62a' and inverter 62a" are mutually separated but connected inside the lamp body 52b with the cables W1 used as the harness which is not exposed to the exterior, safety can be improved.

Further, it is possible to render the interior of both of the lighting device 62a and lamp fixture 5b to be waterproof without requiring either a waterproof structure or a cover of exclusive use for the waterproofness, since the lighting unit 6b with the block member 61b is shaped for blocking the first opening 521b of the lamp Sb and with the lighting device 62a mounted in this block member 61b, and since the elastic member 7b is interposed between the lamp fixture 5b and the block member 61b for sealing between them. This allows the parts to be reduced and the waterproof mechanism to be simplified. Further, as the lighting device 62a is not required to be waterproof, it is possible to reduce the total costs.

Further, the lamp body 52b and block member 61b need not be entirely, of a metal, but may be of metal plated on a resin to have a shielding effect. Further, the elastic member 7b of a structure capable of being adhered to the inner surface of edge parts of the respective fitting parts 611b of the lighting unit 6b may also be employed.

Figure 4:
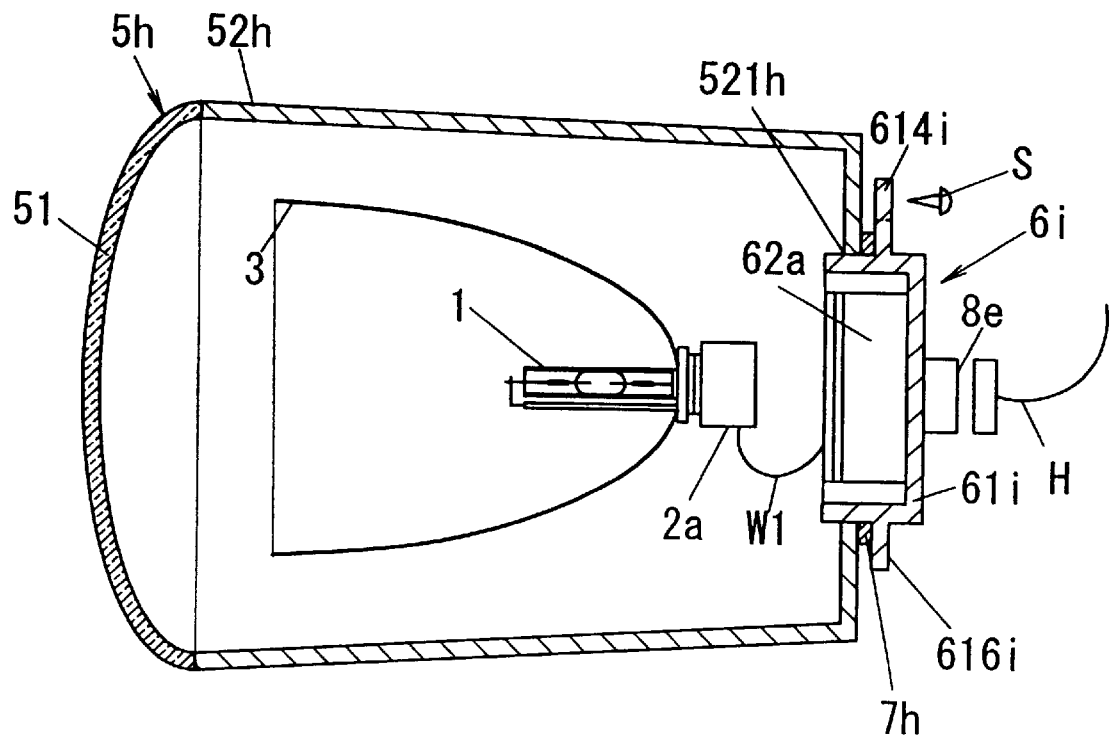
FIG. 4 is a sectioned view showing the luminaire in another embodiment according to the present invention.
Figure 5:
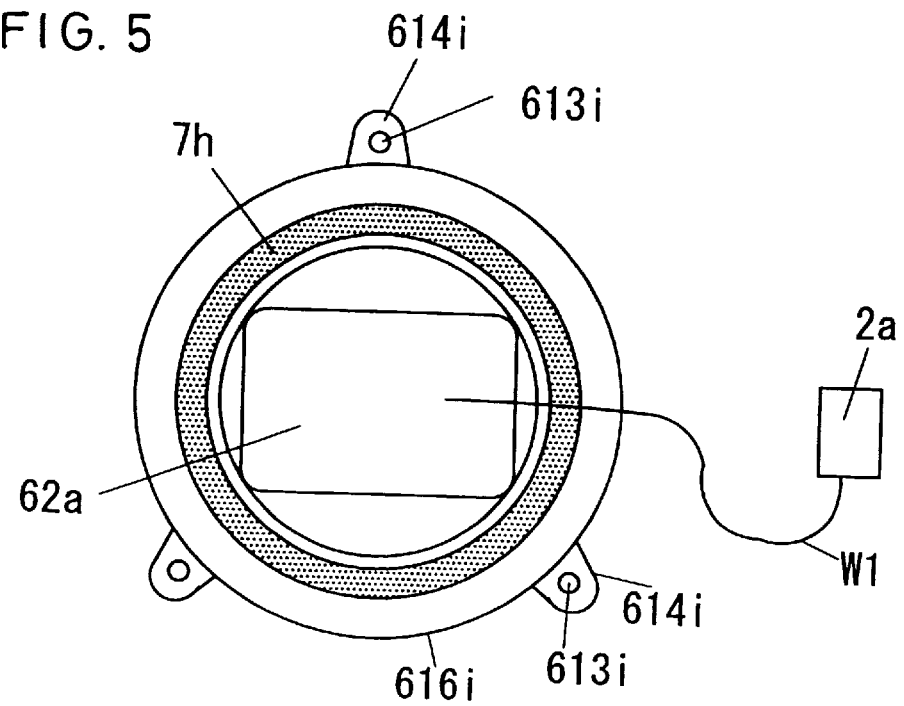
FIG. 5 is a side view of the luminaire in FIG. 4.

The luminaire in another embodiment of the present invention as shown in FIGS. 4 and 5 comprises the discharge lamp 1, lamp socket 2a, reflector 3, lamp fixture 5h, lighting unit 6i and elastic member 7h. The block member 61i provided integrally with the lighting unit 6i is formed with a metal plate or the like having the shielding effect into a shape capable of blocking the first opening 521h of the lamp body 52h or a bottomed cylindrical shape opened on its front side, and having in the middle of a side face a flange 616i provided peripherally. Further, the flange 616i has on its outer periphery a plurality of projections 614i sequentially provided in a state mutually, separated and made to have through holes 613i for the screws S. Further on the front face of the flange 616i, the elastic member 7h is adhered. In a mounting wall of the block member 61i for the lighting device 62a, a through hole (not shown) is bored for connection between the lighting device 62a and a coupler 8e which is mounted to an outer face of the block member 61i where the through hole is present, and respective connecting terminals of the coupler 8e are electrically connected to power source terminals of the lighting device 62a.

Referring next to an example of the assembly sequence of the lighting unit 6i to the lamp fixture 5h, initially the discharge lamp 1 is inserted through the hole of the reflector 3 into the concave mirror and mounted to the rearmost part of the reflector 3, and then the lamp socket 2a is mounted to the electrode part of the discharge lamp 1, thereafter the first opening 521h of the lamp body 52h is blocked by the lighting unit 6i with its side of the lighting device 62a faced frontward, and subsequently the lighting unit 6i is fastened to the lamp body 52h by means of the plurality of screws S. The interior of the lamp fixture 5h is thereby in the sealed state.

As has been described, both of the lighting device 62a and the interior of the lamp fixture 5h can be made waterproof without requiring either the waterproof structure or the cover of exclusive use for the waterproofness, by configuring the light unit 6i with the block member 61i formed in a shape capable of blocking the first opening 521h of the lamp fixture 5h as well as the lighting device 62a mounted to the inner wall of the block member 61i, and employing the elastic member 7h interposed between the lamp fixture 5h and the block member 61i for sealing between them. As a result, the reduction of parts and simplification of the waterproof mechanism can be made possible. It is also not required to provide the lighting device 62a in the waterproof structure, and a total cost reduction is possible.

Further, as the block member 61i of the lighting unit 6i acts also as the lamp cover, the reduction of parts number is possible. As the block member 61i of the lighting unit 6i is disposed at the rear, the effort for exchanging the discharge lamp 1 is easier. As the coupler 8e is connected to the lighting device 62a through the through hole of the block member 61i, further, the interior of the lamp fixture 5h can be made more optimumly waterproof merely by employing a further waterproof structure only with respect to the portion of the through hole.

Figure 6:
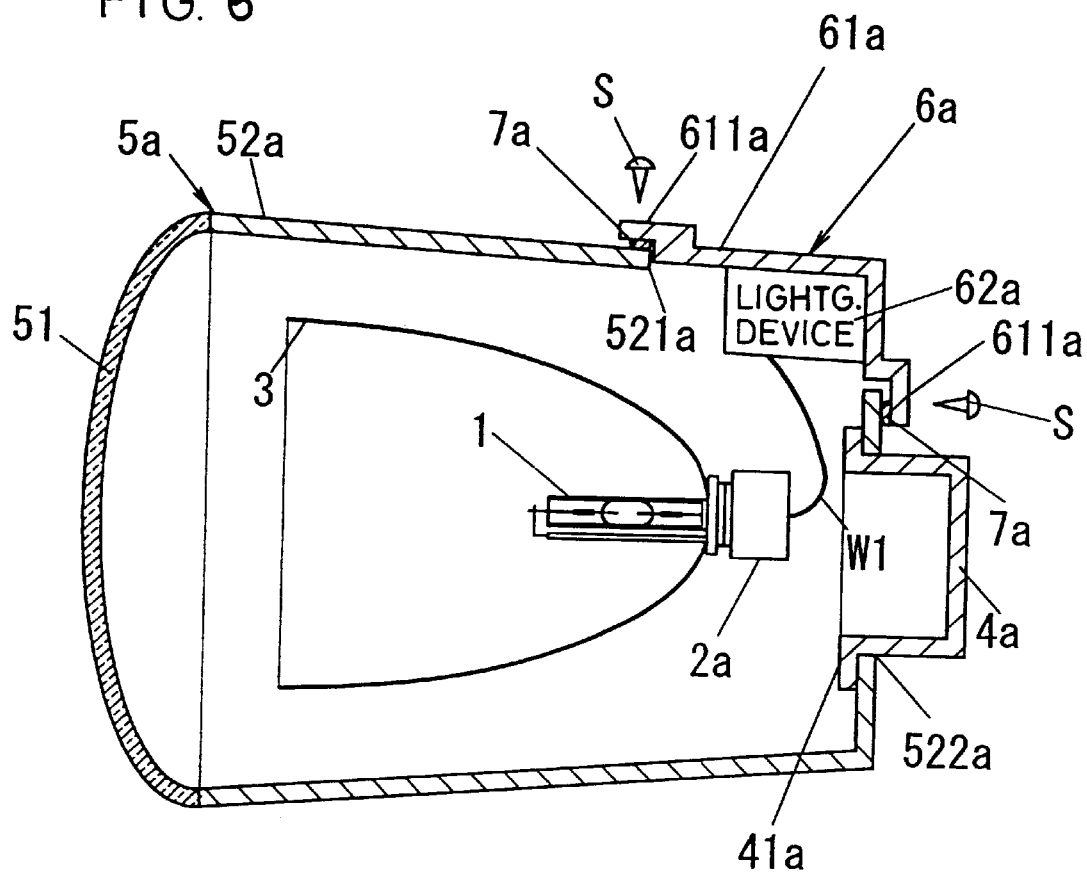
FIG. 6 is a sectioned view showing the luminaire in another according to the present invention.

According to the present invention, further, the lighting unit can be disposed at appropriate position. In the luminaire of another embodiment of the present invention as shown in FIG. 6, the lamp cover 4a is for mounting and exchanging the discharge lamp 1 and is formed in a box shape having a front opening and a flange 41a formed outward at edge part of the front opening. This lamp cover 4a is mounted to the lamp 5a by means of, for example, screws (not shown) or the like.

The lamp 5a is constituted by the lens 51, and the lamp body 52a made of a metal and housing therein the discharge lamp 1, lamp socket 2a and reflector 3. The lamp body 52a is formed in a box shape having the front opening which is blocked by the lens 51, as well as a first opening 521a on lower side with respect to the discharge lamp 1 and opening 522a on rearward center side to be blocked by the lamp cover 4a. Further, adjacent the first opening 521a of the lamp body 52a, a plurality of tapped holes for the screws S are formed. The lighting unit 6a is integrally provided with the lighting device 62a and block member 61a, and the lighting device 62a is formed in a box shape opened upward while having a fitting part 611a to be fitted in the first opening 521a and being one size larger than the fitting part 611a.

In this case, the fitting part 611a of the lighting unit 6a is first fitted in the first opening 521a of the lamp body 52a with the lighting device 62a disposed downward, and then the lighting unit 6a is fastened to the lamp body 52a by means of the screws S. At this time, the elastic member 7a is disposed between edge parts of the first opening 521a and of the fitting part 611a. Thereby the lighting unit 6a, in particular, the lighting device 62a is disposed at upper corner part of rear wall in the lamp body 52a as aligned with horizontal direction.

Figure 7:
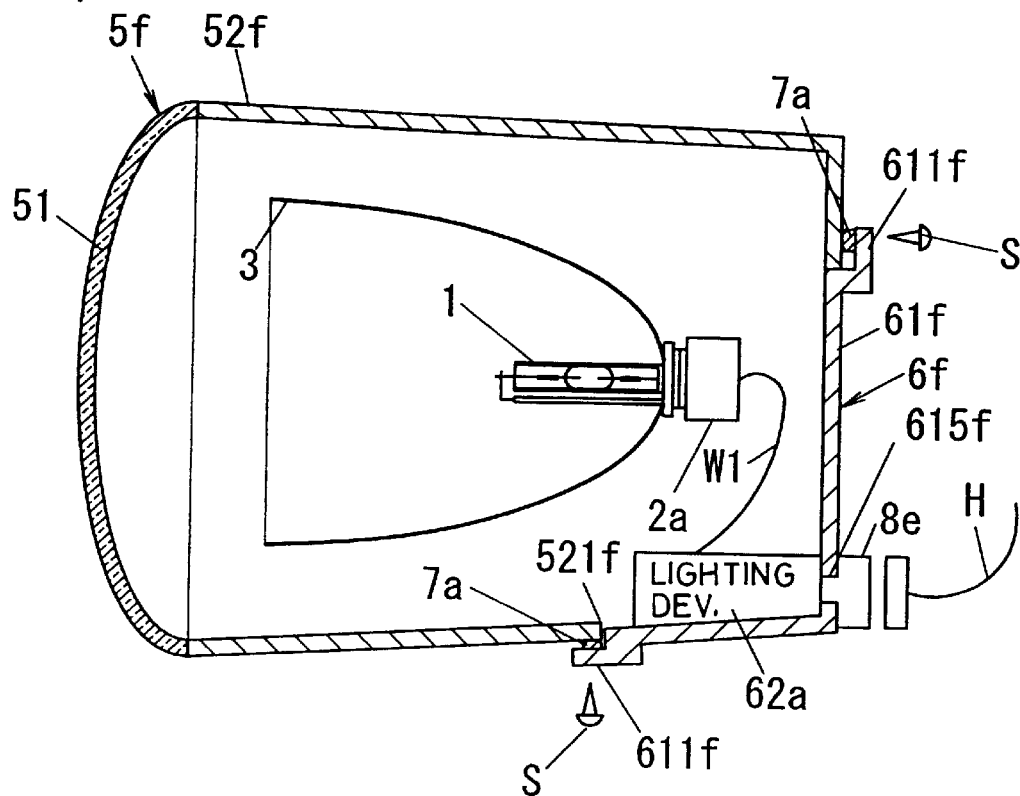
FIG. 7 is a sectioned view showing the luminaire in another according to the present invention.

The luminaire in another embodiment of the present invention as shown in FIG. 7 comprises the discharge lamp 1, lamp socket 2a, ref lector 3, lamp fixture 5f, lighting unit 6f, elastic member 7a and coupler 8e. The lamp fixture 5f is constituted by the lens 51 and the lamp body 52f made of a metal and housing therein the discharge lamp 1, lamp socket 2a and reflector 3. This lamp body 52f is formed in a box shape having a front opening to be closed by the lens 51 and the opening 521f over a wide range covering both a downward rear side and an rearward upper side with respect to the discharge lamp 1. Adjacent the opening 521f of the lamp body 52f, a plurality of the tapped holes for the screws S are formed.

The lighting unit 6f is provided integrally with the lighting device 62a and block member 61f, while the block member 61f is formed with a metal plate having the shield effect into a shape blocking the opening 521f of the lamp body 52f, or in an L-shape in cross section with one surface directed upward and another surface directed forward and having engaging stepped parts 611f at respective edges on the lower and rear sides. In the respective engaging stepped parts 611f of the block member 61f, further, a plurality of through holes (not shown) are bored for the screws S. Further, the elastic member 7a is adhered to the inner surface at edge portions of the respective fitting stepped parts 611f. A through hole 615f for connection between the lighting device 62a and the coupler 8e is made in a mounting wall for the lighting device 62a of the block member 61f, the coupler 8e is mounted to outer surface of the block member 61f at the position of the through hole 615f, and respective connecting terminals of the coupler 8e and the respective power source terminals of the lighting device 62a are electrically connected through the through hole 615f.

In this case, the arrangement is so made that the lighting device 62a is mounted to an inner surface on a lower side of the block member 61f, and output lines are electrically connected through the cables W1 to the respective connecting terminals of the lamp socket 2a. In this embodiment of FIG. 7, the lighting device 62a is disposed at a lower corner of the rear wall of the lamp body 52b to be in the horizontal direction.

Figure 8:
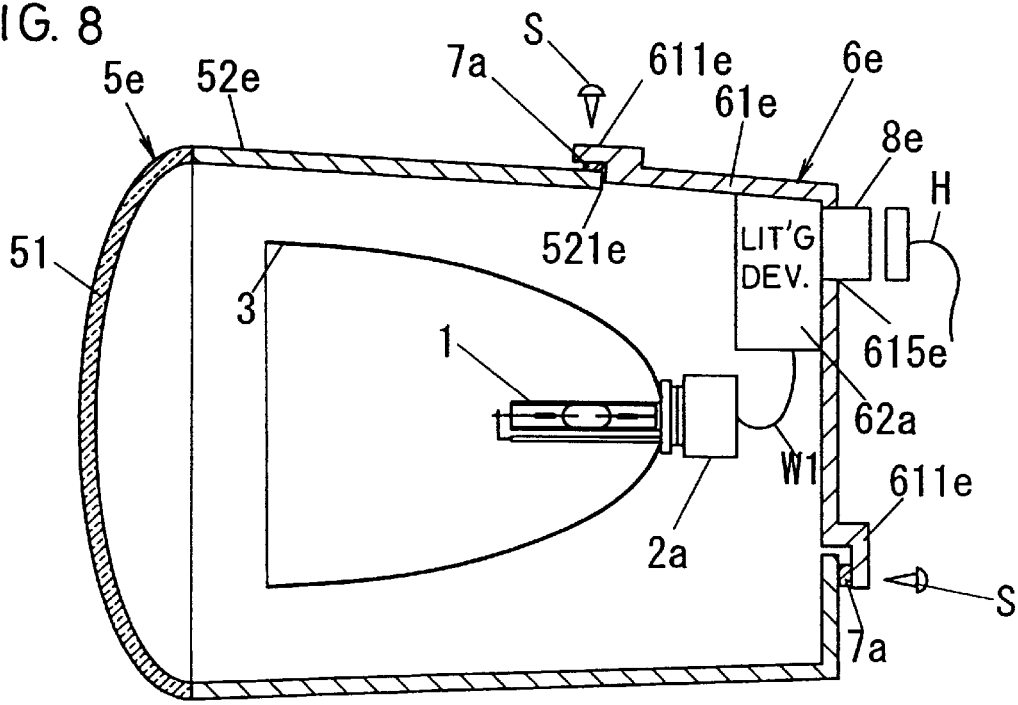
FIG. 8 is a sectioned view showing the luminaire in another according to the present invention.

The luminaire in another embodiment of the present invention as shown in FIG. 8 comprises the discharge lamp 1, lamp socket 2a, reflector 3, lamp fixture 5e, lighting device 6e, elastic member 7a and coupler 8e, and a wiring harness H is connected to the coupler 8e.

The lamp fixture 5e is constituted by the lens 51 and the metal made lamp body 52e housing therein the discharge lamp 1, lamp socket 2a and reflector 3. This lamp body 52e is formed in the box shape having the front opening which is closed by the lens 51, and is provided with the opening 521e in a wide range covering both of the upper rearward side and rear lower side with respect to the discharge lamp 1. Adjacent the opening 521e of the lamp body 52e, further, a plurality of the tapped holes for the screws S are formed.

The lighting unit 6e is so constituted as to be provided integrally with the lighting device 62a and block member 61e. The block member 61e is formed by the metal plate having the shield effect, in a shape blocking the opening 521e of the lamp body 52e or in an L-shape in cross section having surfaces facing downward and forward, respectively, and having the fitting stepped parts 611e at respective edge parts on the upper and rear sides with respect to the discharge lamp 1. The respective fitting stepped parts 611e of the block member 61e are provided with the plurality of through holes (not shown) for the screws S. To the inner surface at edge portions of the respective fitting stepped parts 611e, further, the elastic member 7a is adhered. In the block member 61e, the mounting wall for the lighting device 62a is bored to have the through hole 615e for the connection between the lighting device 62a and the coupler 8e.

However, the lighting device 62a is mounted to the inner surface of the rear side of the block member 61e, and is SO constituted that its outputs are electrically connected through the cables W1 to the respective connection terminals of the lamp socket 2a. In the present embodiment of FIG. 8, the lighting device 62a is disposed to be vertical at an upper corner of the rear wall in the lamp body 52e.

Also in the respective embodiments shown in FIGS. 4 and 5 and in each of FIGS. 6–8, the same safety as in the above described embodiment can be attained by providing the igniter to the lamp socket and disposing the inverter in the lighting device.

Figure 9:
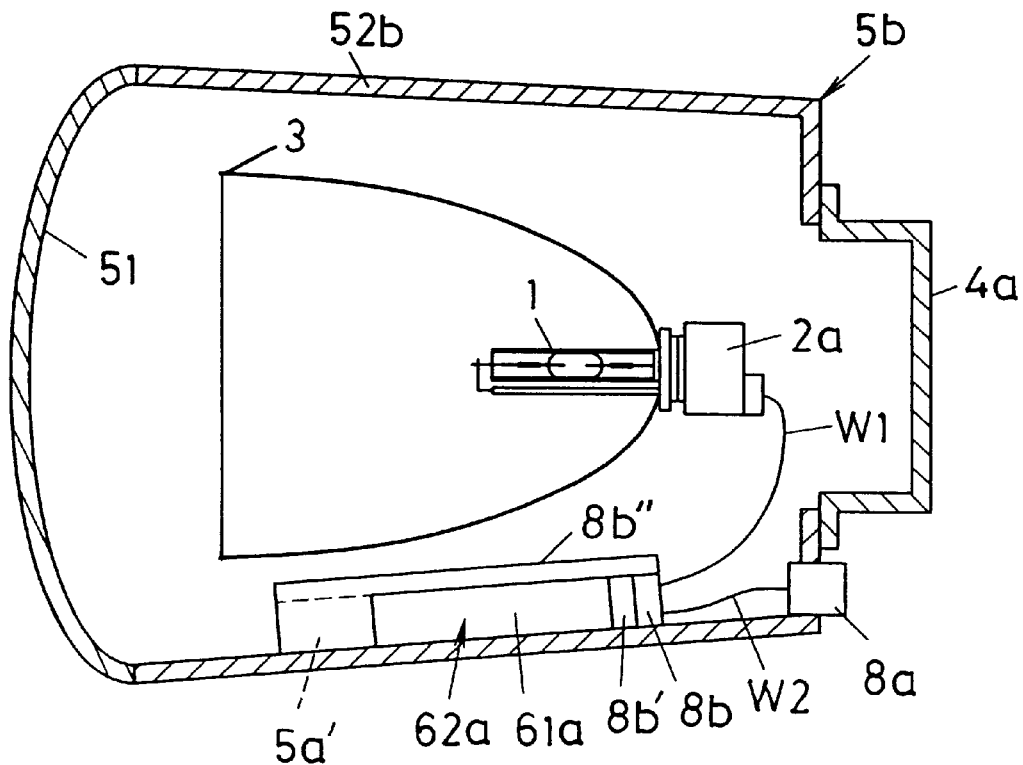
FIG. 9 is a sectioned view showing the luminaire in another according to the present invention.

The luminaire in another embodiment of the present invention as shown in FIG. 9 comprises the discharge lamp 1, lamp socket 2a, reflector 3, lamp fixture 5b, lighting unit powder source coupler 8a, first and second load-side coupler members 8b and 8b' and partition 8b". More specifically, the discharge lamp 1 such as the HID lamp is disposed in the lamp body 52b provided with the reflector 3 such as the concave mirror, and a housing chamber 5a' for housing the lighting device 62a is formed in interior space of the lamp body 52b. The lamp cover 4a is provided to the rear wall to cover the opening of the lamp body 52a. The lamp body 52a and lamp cover 4a are detachably coupled with such fixing tool as the screws employed. The lamp cover 4a is detached from the lamp body 52b at the time when the discharge lamp 1 is exchanged and so on. The front side of the lamp body 52b should preferably be covered by a lamp cover having the light transmitting properties.

Figure 10:
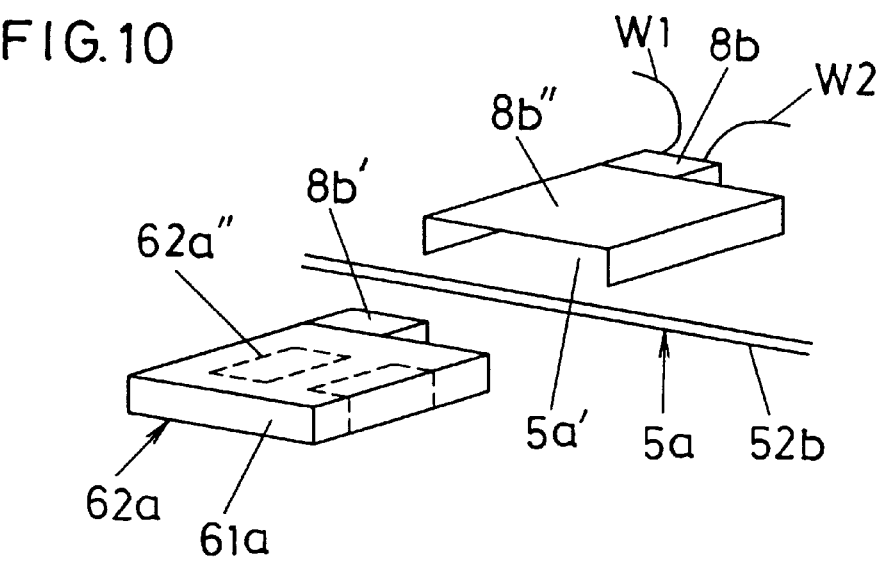
FIG. 10 is a fragmentary perspective view as disassembled embodiment of the luminaire in FIG. 9.

The housing chamber 5a' is a space enclosed by a partition 8a" formed to be U-shaped in section and integral with a planar part of the inner periphery of the lamp body 52b, as shown in FIG. 10, and the first coupler member 8b is provided to a surface of the housing chamber 5a' on the rear end side of the lamp body 52b. This first coupler member 8b may be integrally molded with the lamp body 52b. To the first coupler member 8b, further, the lamp socket 2a is connected through the load cables W1 forming the harness, and the power source coupler 8a as a power source connector is connected through a power source cable W2 forming the harness. The lamp socket 2a is fixed to the regular position on a rear side surface of the reflector 3 in the interior of the lamp body 52b so as to hold the discharge lamp 1 and to electrically connect the load cable W1 to the discharge lamp 1 on the other hand, the power-source coupler 8a is fixed by being passed through the rear wall, and a connecting part of the power-source coupler 8a is formed on an outer side of the lamp body 52a.

The connecting part of the first coupler member 8b is formed on an inner side of the housing chamber 5a', and the coupler Bb1 provided to the lighting device 62a is detachably coupled to this first coupler member 8b. The lighting device 62a is constituted by a housing in the block member 61a of a rectangular parallelepiped shape. The igniter 62a' applies a high voltage pulse to the discharge lamp 1 upon its starting and the inverter 62a" maintains the lighting of the discharge lamp 1 with the DC source power converted, and the second coupler member 8b' is mounted to one surface of the block member 61a. This second coupler member 8b' is provided with contacts electrically connected to the power source and to the discharge lamp 1. For the second coupler member 8b', one which is mechanically coupled at a relatively high strength to the first coupler member 8b, is employed. Therefore, the lighting device 62a is to be mounted to the lamp body 52b as the block member 61a of the lighting device 62a is inserted from the opening side of the housing chamber 5a' up to a position where the second coupler member 8b' is coupled to the first coupler member 8b. Further, because the lamp socket 2a and first coupler member 8b are connected by means of the load cable W1, and the powder source coupler 8a and first coupler member 8b are connected by means of the source cable W2, the electric connection and mechanical fixation are to be simultaneously attained as the lighting device 62a is mounted to the housing chamber 5a'.

Figure 11:
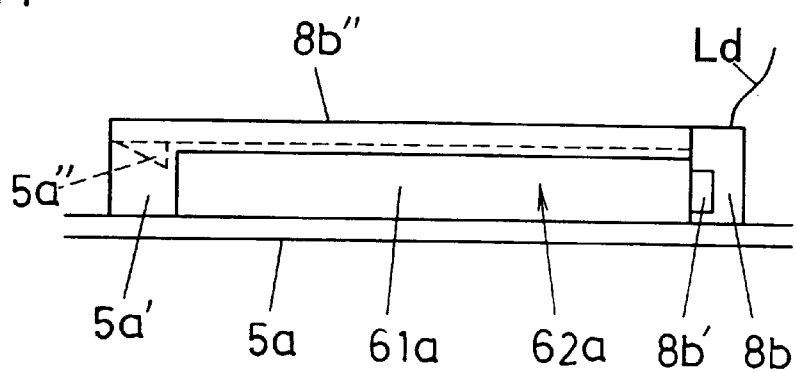
FIGS. 11–14 are fragmentary explanatory views as magnified respectively of other embodiments according to the present invention.

In this case, as shown in FIG. 11, the housing chamber 5a' is provided on an inner periphery adjacent to the opening thereof with a locking projection 5a" which increases its projection from the side of the opening toward inner side. Thus, the block member 61a of the lighting device 62a will be locked by the locking projection 5a" at the position where the first coupler member 8b of the lighting device 62a is coupled to the first coupler member 8b fixed to the lamp body 5a. With this arrangement, the block member 61a of the lighting device 62a is to be so locked as to be in the state of being housed in the housing chamber 5a' and not to fall off from the housing chamber 5a'. Consequently, there is no member which penetrates throughout the lamp body 5a except for the power source coupler 8a, and no waterproofing is required for the lighting device 62a, so as to result in the reduction of costs. Further, while the lighting device 62a is housed within the lamp body 5a, the interposition of the reflector 3 and lamp cover 4a between the device and the discharge lamp 1 restrains any overheating of the lighting device 62a.

Figure 12:
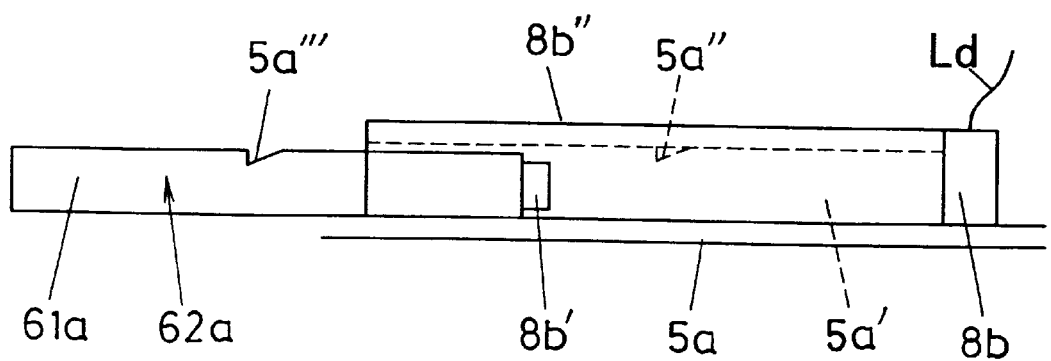
Figure 13:
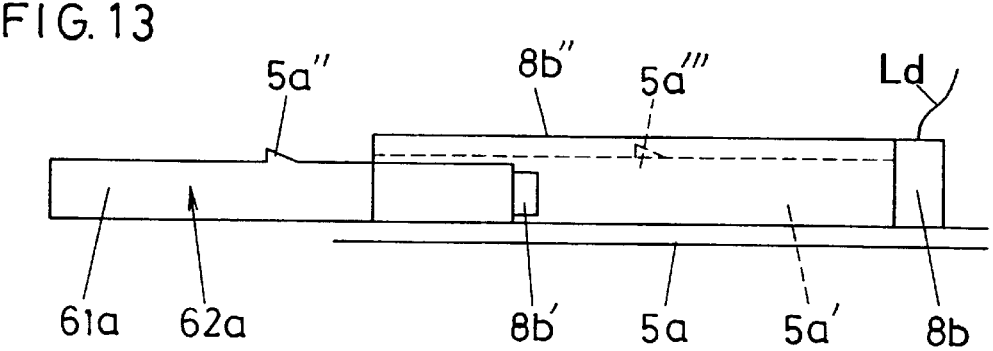
Figure 14:
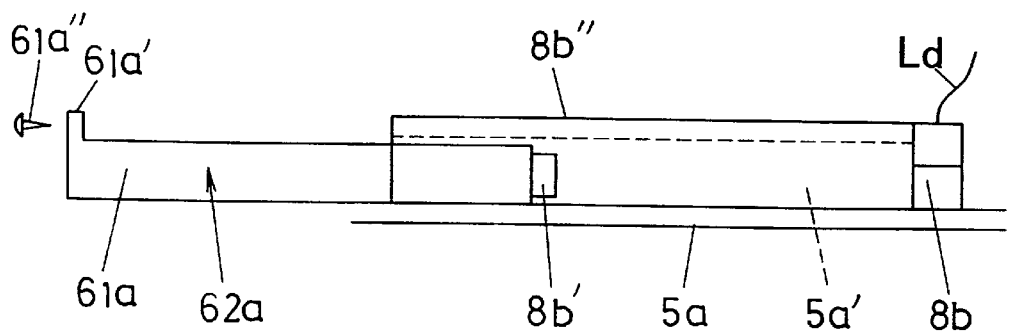

As regards the technique for fixing the block member 61a of the lighting device 62a to the housing chamber 5a' without falling off, the mechanism shown in FIGS. 12 through 14 may be adopted. That is, as shown in FIG. 12, a locking recess 5a'" is provided in a surface of the block member 61a opposing to the partition 8b", and the locking projection 5a" which engages in the locking recess 5a'" in the state where the block member 61a is mounted to the housing chamber 5a' is provided to project on the inner periphery of the partition 8b". Further, as shown in FIG. 13, the locking projection 5" is provided to project on the surface of the block member 61a opposing to the partition 8b" while the locking recess 58'" is provided to the partition 8b" so that the same function as that shown in FIG. 12 will be attained. As shown in FIG. 14, further, the block member 61a is provided with a mounting leaf 61a' projecting at an end part opposite to the second coupler member 8b', and a fixing screw 61a" passed through the mounting leaf 61a' is screwed to part of the partition 8b". With this arrangement, therefore, the block member 61a is fixed to the lamp body 5a by means of the fixing screw 61a", and it is possible to further increase the coupling strength of the lighting device 62a with respect to the lamp body 5a.

Figure 15:
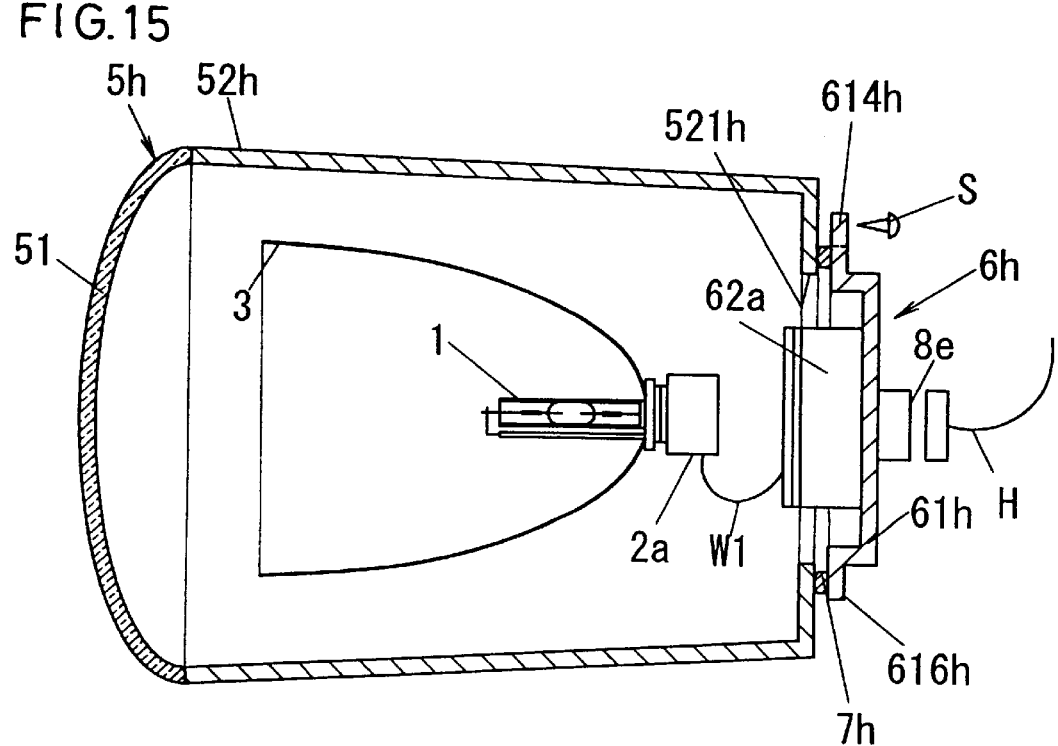
FIG. 15 is a sectioned view showing the luminaire in another embodiment according to the present invention.

The luminaire in another embodiment of the present invention shown in FIG. 15 comprises the discharge lamp 1, lamp socket 2a, reflector 3, lamp fixture 5h, lighting unit 6h, elastic member 7h and coupler 8e. The lamp fixture 5h is constituted by the lens 51 and the metal-made lamp body 52h housing therein the discharge lamp 1, lamp socket 2a and reflector 3. This lamp body 52h is formed in a box shape having a front opening closed by the lens 51 and a circular first opening 521h on the rear side with respect to the discharge lamp 1. A plurality of tapped holes for the screws S are formed adjacent to the first opening 521h of the lamp body 52h.

The lighting unit 6h is provided integrally with the lighting device 62a and block member 61h. This block member 61h is formed with the metal plate or the like having the shield effect, into a shape blocking the first opening 521h of the lamp body 52h, or into a bottomed cylinder having the front opening and a flange 616h provided along peripheral edge of the opening. A plurality of projected leaves 614h having through holes 613h for the screws S are sequentially provided as mutually separated on an outer periphery of the flange 616h. Further, on the mounting surface of the block member 61h for the lighting device 62a, a through hole (not shown) is provided as projected for connection of the lighting device 62a and coupler 8e. The coupler 8e can be mounted to the outer surface of the block member 61h having this through hole, and the respective connecting terminals of the coupler 8e are to be electrically connected to the source terminals of the lighting device 62a through the through hole.

Figure 16:
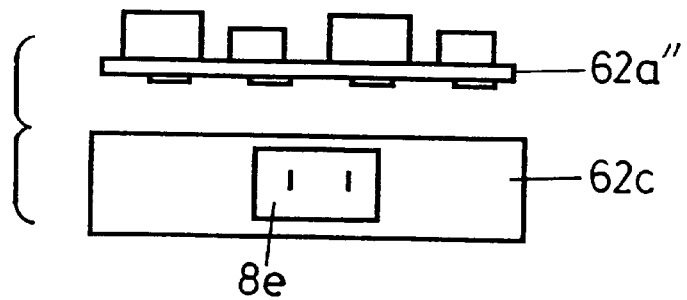
FIGS. 16–18 are fragmentary explanatory views as magnified respectively of other embodiment according to the present invention.
Figure 17:
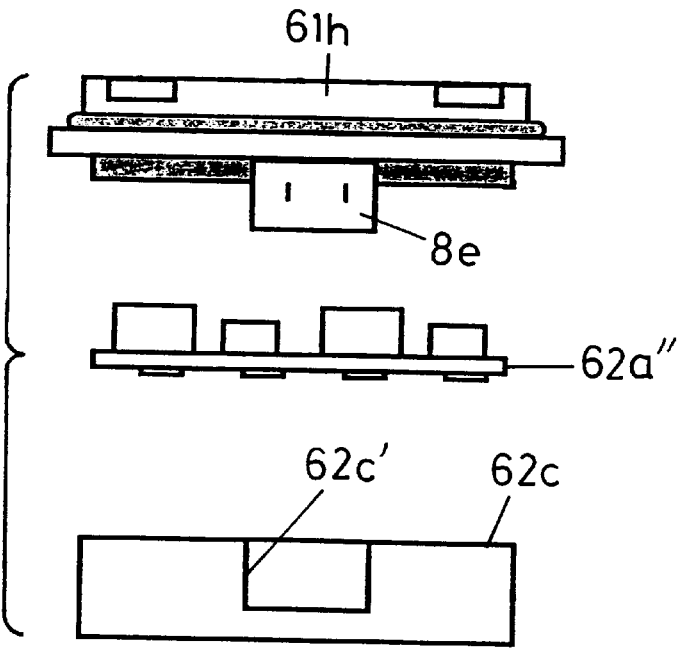
Figure 18:
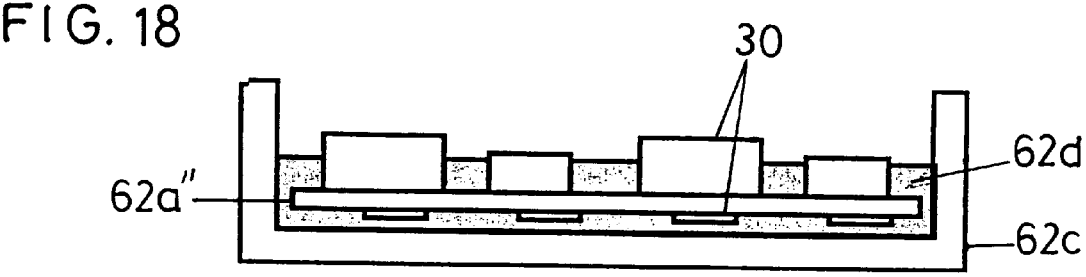

In the present invention, further, various design modification is possible. In particular, in the embodiment of FIGS. 1–3, the connection between the lighting device including the inverter and the socket provided with the igniter may be replaced by a connection of the harness and coupler or a connection only by means of the coupler. As shown in FIG. 16, further, the coupler 8e may be secured to a casing 62c on which the inverter 62a" is loaded, and, if required, the coupler 8e can be waterproof. On the other hand, as shown in FIG. 17, the constitution may be such that the casing 62c carrying the inverter 62a" may be provided with a fitting notch 62c', the coupler 8e is secured to the block member 61h and, when the inverter 62a" is coupled to the block member 61h, the coupler 8e will be fitted in the fitting notch 62c'. As shown in FIG. 18, further, such electronic parts 30 as the inverter 62a and so on are housed in the casing 62c, and a resin 62d is pored in the interior of this casing 62c. This attains an attempt of heat radiation from the electronic parts and discharge lamp when the casing 62c is made of a metal.

Figure 19:
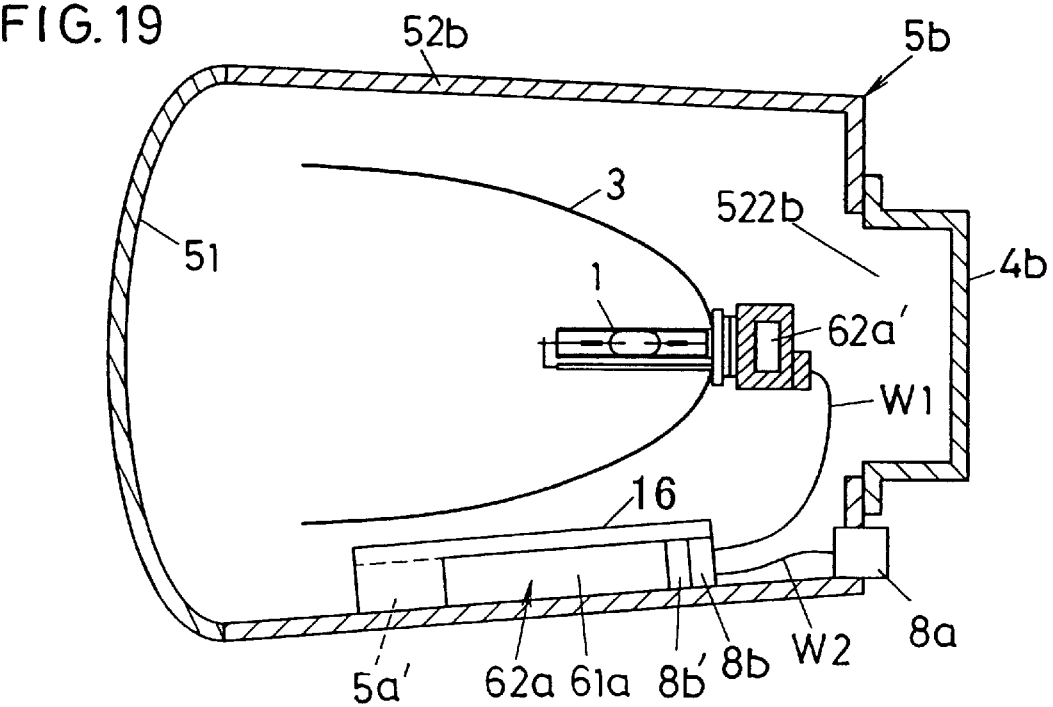
FIGS. 19 and 20 are sectioned views respectively of other embodiments according to the present invention.

Also as shown in FIG. 19, the constitution may be such that a discharge lamp 1 connected to the cable W1 without the lamp socket 2a is used, and the discharge lamp 1 incorporates therein the igniter 62a'.

Figure 20:
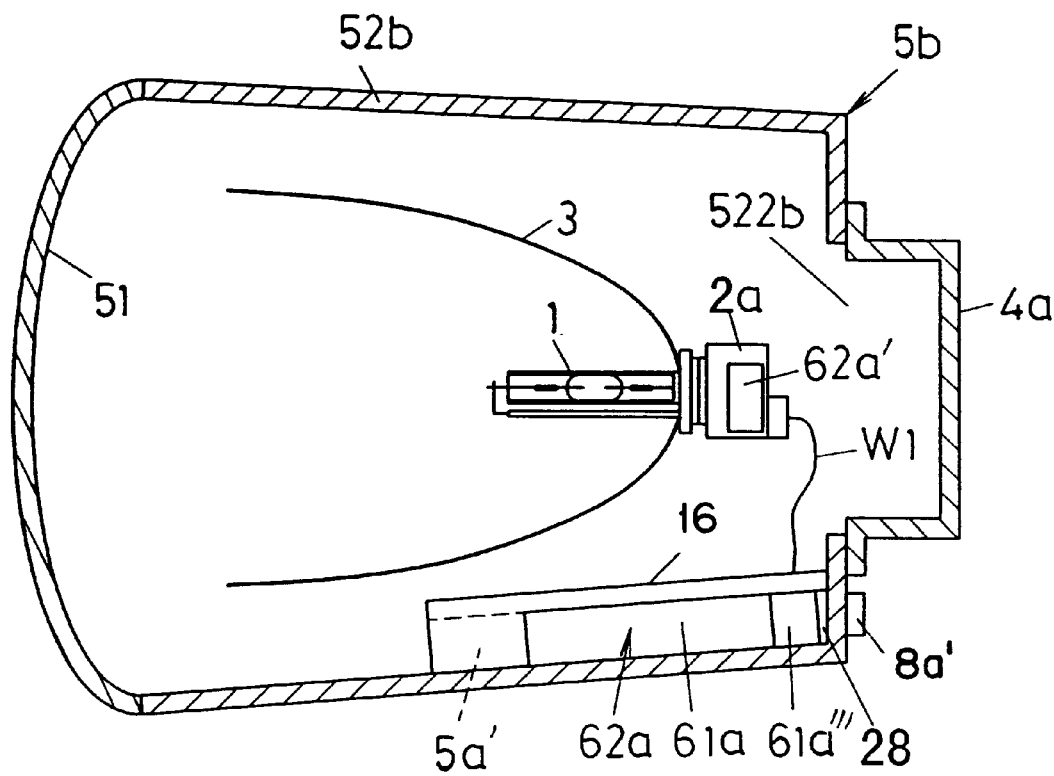
Figure 21:
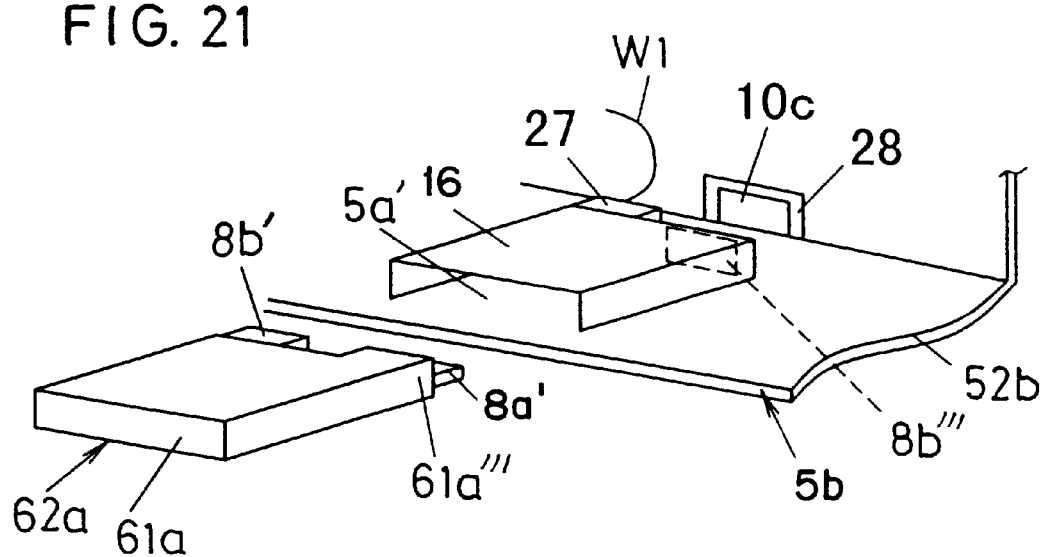
FIG. 21 is a fragmentary perspective view as disassembled of the luminaire in FIG. 19.
Figure 22:
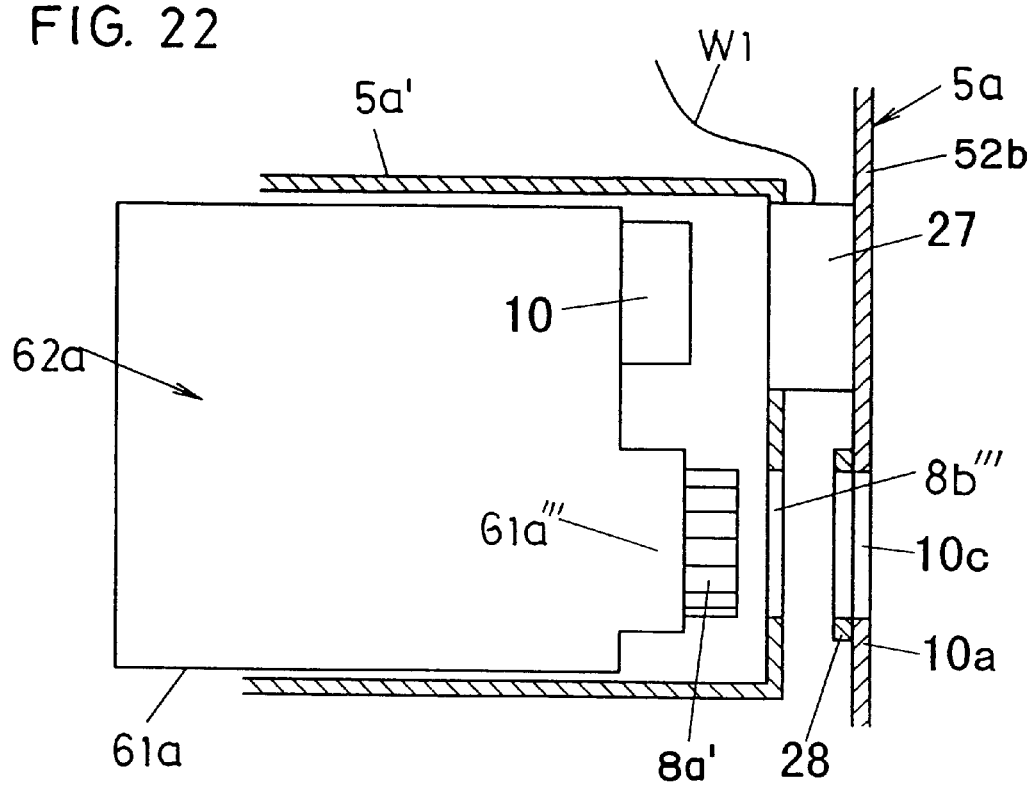
FIGS. 22 and 23 are fragmentary sectioned views as magnified respectively of other embodiments according to the present invention.
Figure 23:
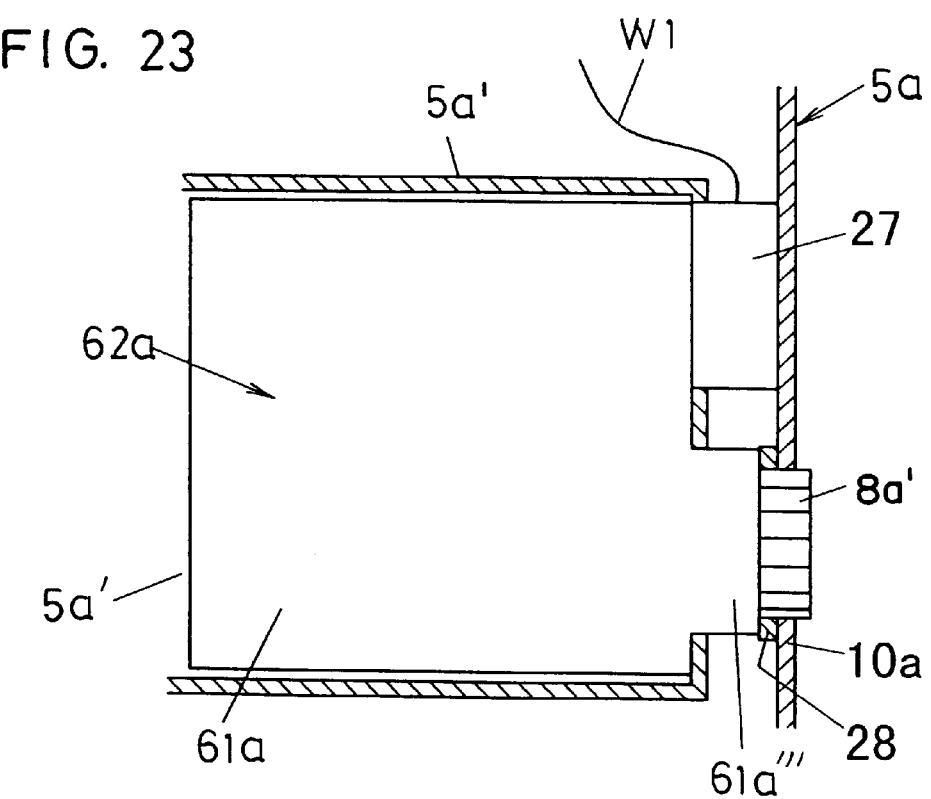

In the present embodiment, as shown in FIGS. 20 and 21 and in FIGS. 22 and 23, the lighting device 62a in other embodiments of the present invention is provided with two couplers 8a' and 8b', one of which couplers 8b' on the load side is coupled to a coupler 27 disposed between the peripheral wall of the lamp body 52b and the housing chamber 5a', and this coupler 27 is connected through the cable W1 comprising the harness to the lamp socket 2a. Between the peripheral wall of the lamp body 52b and the housing chamber 5a', a gap corresponding to the thickness of the coupler 27 is formed, and a projection 61a''' of dimensions corresponding to this gap is formed on the case 61a of the lighting device 62a. The other second coupler member 8a' on the power side is formed in a shape projecting out of the projection 61a'''. Here, the couplers 8a' and 8b' are formed by a conducting pattern at end parts of a printed wiring substrate on which circuit parts constituting the lighting device 62a are mounted. That is, the printed wiring substrate is partly projected, and the couplers 8a' and 8b' are formed on this projected part by forming a plurality of linear conducting patterns along projecting direction. The power-source side coupler 8a' is connectable to a card edge connector, and forms a power source connecting section connected to the power source. By such separate provision of the power-source side and load-side couplers 8a' and 8b', it is possible to separate the interior wiring of the lamp body 5b and the source power system from the exterior of the lamp body 5b, and any leakage of load side output to the source side can be prevented. In the partition 16 of the housing chamber 5a', a through hole 8b''' for passing the projection 61a" is formed, and a lead hole 10c for passing the second coupler member 8a' is formed in the peripheral wall of the lamp body 5a. Around the lead hole 10c, an elastic member 28 acting as a packing is disposed so that, in the state where the case 61a is mounted to the housing chamber 5a', the elastic member 28 will be held between the projection 61a" and the inner surface of the peripheral wall of the lamp body 5a. By holding in this way the elastic member 28 between the case 61a and the lamp body 5a, the waterproofness around the lead hole 10c can be assured. Also in this state, the second coupler member 8b' is coupled to the coupler 27.

In the present embodiment, the lamp socket 2a is connected through the cable W1 to the coupler 27 housed in the interior of the lamp body 5a, so that, similar to the first embodiment, the lighting device 62a and lamp socket 2a can be connected just by mounting the lighting device 62a to the housing chamber 5a', and the assembling work is rendered easier. Yet, in the present embodiment, the power-source side coupler 8a' for connection to the power source through the lead hole 10c formed in the peripheral wall of the lamp body 5a is projected out of the lamp body 5a, so that, as compared with the foregoing embodiments, the cable W1 is made unnecessary and the assembling work is made more easier. Other constitution and operation are the same as in the foregoing embodiments.

Figure 24:
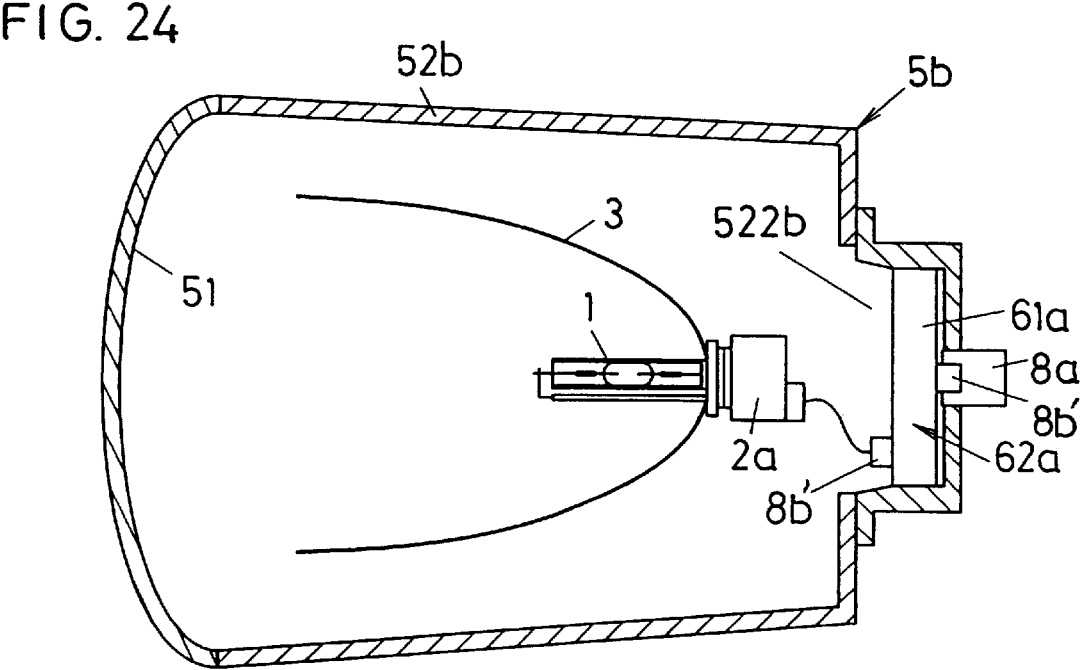
FIGS. 24 and 25 are sectioned views respectively showing the luminaire in other embodiments according to the present invention.

In another embodiment according to the present invention shown in FIG. 24, the housing chamber 522b to which the parallelepiped case 61a of the lighting device 62a is mountable is provided in the lamp cover 4b. That is, a space communicating with the inner side of the lamp body 5a in the lamp cover 4b is recessed, and the housing chamber 522b is formed at such recessed portion. On one surface of the case 61a which will be on the side of the lamp socket 2a in the state where the case 61a is mounted to the housing chamber 522b, the load side second coupler member 8b' is provided, while on opposing side to the inner periphery of the lamp cover 4b the source coupler 8a to which the source side coupler 8a' can be coupled is mounted. The second coupler member 8b' is connected to the lamp socket 2a employing the cable W1 forming the harness.

With the above constitution, the lighting device 62a is detachable merely by dismounting the lamp cover 4b from the lamp body 52b, and the assembling work is rendered easier. Since the lighting device 62a is housed in the lamp cover 4b, further, no waterproofing is required therefor, so as to result in the reduction of costs.

Figure 25:
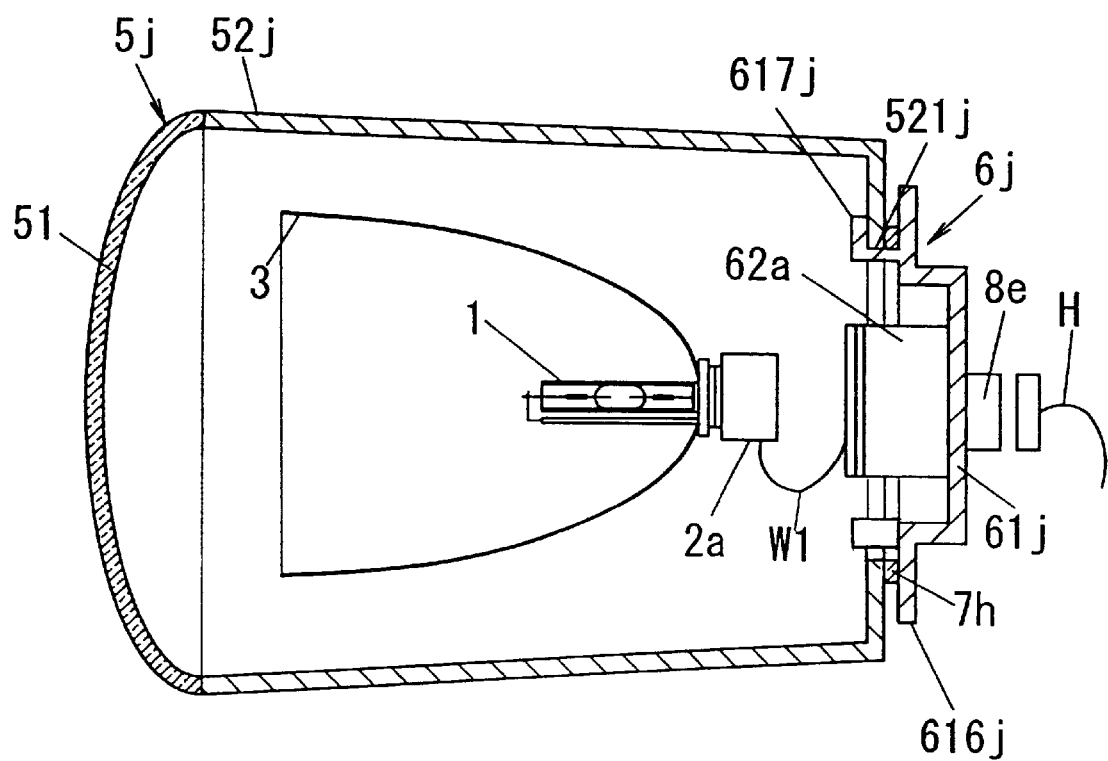
Figure 26:
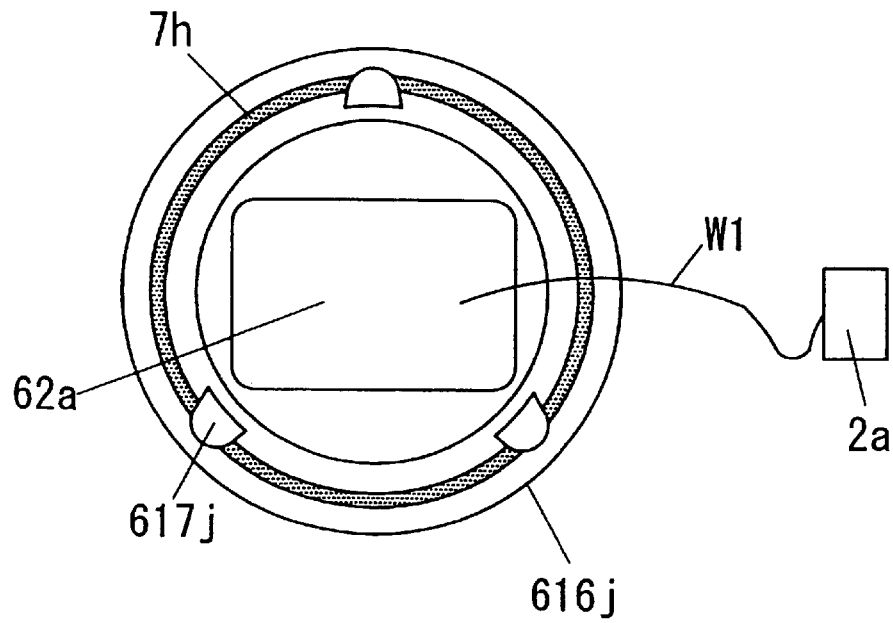
FIG. 26 is a side view of the luminaire in FIG. 25.

The luminaire in another embodiment according to the present invention as shown in FIGS. 25 and 26 comprises the discharge lamp 1, lamp socket 2a, reflector 3, elastic member 7h and coupler 8e, as well as the lamp body 5j and lighting unit 6j. The lamp body 5j is constituted by the lens 51 and the metal made lamp body 52j housing therein the discharge lamp 1, lamp socket 2a and reflector 3. This lamp body 52j is formed into the box shape having the front opening closed by the lens 51 and the circular opening 521j on rear side of the discharge lamp 1. The opening 521j is provided with sequential grooves (not shown) for inserting bent projections 617j later described.

The lighting unit 6j is so constituted as to be integrally provided with the lighting device 52a and block member 61j. This block member 614 is formed with a metal plate or the like having the shield effect, in a shape for blocking the opening 521j of the lamp body 52j, or a box shape having a front opening (a bottomed box shape in FIGS. 25 and 26) and a flange 616j on the peripheral edge of the opening. Further, the block member 61j is formed to have a plurality of the bent projections 617j in a state mutually separated as extended forward from a base part of the flange 616j and bent outward. Onto a front face of the flange 616j, the elastic member 7h is adhered. In mounting surface of the block member 61j for the lighting device 62a, a through hole (not shown) for the connection between the lighting device 62a and the coupler 8e is bored. The coupler 8e is mounted to the outer surface of the block member 61j having the through hole, and the respective connecting terminals of the coupler 8e are electrically connected to the source terminals of the lighting device 62a.

Next, an example of assembling sequence of the lighting unit 6j to the lamp 5j shall be described. Initially, the discharge lamp 1 is mounted to the rearmost part of the reflector 3 as inserted through the hole of the reflector 3 into the concave mirror, and then the lamp socket 2a is mounted to the electrode section of the discharge lamp 1. Thereafter, the lighting unit 6j is fitted as rotated into the opening 521j of the lamp body 52j with the lighting device 62a side disposed frontward, whereby the interior of the lamp 5j is in a sealed state.

By forming the lighting unit 6j with the foregoing block member 61j formed in the shape blocking the opening 521j of the lamp body 5j, and with the lighting device 52a mounted to the inner surface of this block member 61j, and by employing the elastic member 7h as interposed between the lamp body 5j and the block member 61j to seal between them, it is made possible to waterproof the interior of both of the lighting device 62a and lamp body 5j without requiring either the doubled waterproof structure or the cover for exclusive waterproofing use. It is thereby possible to reduce the parts and to simplify the waterproof mechanism. Further, since the lighting device 62a is not required to be of waterproof structure, it becomes possible to reduce the total costs. Further, as no screw S is required to use for mounting the lighting unit 6j to the lamp body 5j, the reduction of parts number is made possible and the assembling work is rendered easier.

Further, as the block member 61j of the lighting unit 6j also acts as the lamp cover, the reduction of the number of parts is made possible. Further, as the block member 61j of the lighting unit 6j is disposed at the rear, the exchange effort of the discharge lamp 1 is made easier. Yet, as the coupler 8e is connected through the through hole in the block member 61j to the lighting device 62a, it is possible to attain the optimum waterproof charateristics with respect to the interior of the lamp body 5j by adopting additionally the waterproof structure only with respect to the part of the through hole.

What is claimed is:

1. A luminaire for use as an automotive headlamp, comprising a discharge lamp; a lighting device including an inverter for supplying power for lighting the discharge lamp; an igniter for starting the discharge lamp; and a lamp body having at least a discharge lamp holding member and housing therein the discharge lamp; wherein the inverter and the igniter of the lighting device are provided as mutually separated, with the inverter disposed in the lamp body and with the igniter disposed in the lamp body adjacent to the discharge lamp; the inverter and igniter connected together through a wire harness disposed in the lamp body.

2. The luminaire according to claim 1, wherein the igniter is incorporated in a lamp socket mounted to the discharge lamp.

3. A luminaire for use as an automotive headlamp, comprising a discharge lamp; a lighting device including an inverter for supplying power for lighting the discharge lamp; an igniter for starting the discharge lamp; and a lamp body having at least a discharge lamp holding member and housing therein the discharge lamp and the igniter; wherein the inverter and the igniter of the lighting device are provided as mutually separated; the lighting device disposed in the lamp body, and the discharge lamp and the igniter formed integral together, the inverter and the igniter connected together through a wire harness disposed in the lamp body.

4. A luminaire for use as an automotive headlamp, comprising a discharge lamp; a lighting device for supplying power for lighting the discharge lamp; an igniter for starting the discharge lamp; and a lamp body provided at least with a discharge lamp holding member and housing the discharge lamp; wherein the lighting device and the igniter are provided as separated; the lighting device disposed in the lamp body, and the igniter disposed in the lamp body adjacent to the discharge lamp; a block member provided in a shape for blocking an opening of the lamp body; an inverter mounted to the block member on a surface facing the interior of the lamp body; and an elastic member interposed between the lamp body and the block member which blocks the opening of the lamp body.

5. The luminaire according to claim 4 wherein the block member acts also as a lamp cover closing another opening of the lamp body.

6. The luminaire according to claim 4 wherein the opening of the lamp body extends along lower and rear sides thereof and is formed to be L-shaped.

7. The luminaire according to claim 4 wherein the block member is provided with a coupler.

8. The luminaire according to claim 4 wherein the block member is separated by a flange for sealing the opening of the lamp body and a case for housing the inverter.

9. The luminaire according to claim 4 wherein the block member is formed of metal, and electronic parts of the inverter are directly contacted therewith.

10. The luminaire according to claim 4 wherein the block member is formed of metal, and electronic parts of the inverter are contacted therewith through a resin material.

11. A luminaire for use as an automotive headlamp, comprising a high intensity discharge lamp; an inverter supplying power for lighting the high intensity discharge lamp with a rectangular wave; an igniter for starting the high intensity discharge lamp; and a lamp body housing the high intensity discharge lamp and including a reflector which holds at least the high intensity discharge lamp; wherein the inverter and the igniter are provided as mutually separated; the inverter disposed inside the lamp body; the inverter disposed on a member closing an opening of the lamp body; the opening being used for exchanging the discharge lamp; the high intensity discharge lamp connected to a lamp socket to receive the supplied power; and the igniter generating a high voltage for starting the high intensity discharge lamp and disposed in the lamp socket, the lamp socket disposed within the lamp body.

* * * * *